United States Patent [19]

Cross

[11] 4,047,799

[45] Sept. 13, 1977

[54] MULTI-COLOR HAND SIGNAL

[75] Inventor: Howard Cross, Hartsdale, N.Y.

[73] Assignee: Frances Cross, Hartsdale, N.Y.

[21] Appl. No.: 727,665

[22] Filed: Sept. 29, 1976

[51] Int. Cl.[2] .......... G02B 5/12

[52] U.S. Cl. .......... 350/97; 350/98; 350/266; 340/378 R

[58] Field of Search .......... 350/157, 97-104, 350/266; 116/63 P, 63 R, 35; 240/106, 7.15, 93; 41/35 C; D48/30; 340/378 R, 378 A, 378 B

[56] References Cited

U.S. PATENT DOCUMENTS

| | | | |
|---|---|---|---|
| 440,493 | 11/1890 | Morris | 350/97 |
| 1,004,272 | 9/1911 | Jenkins | 350/97 |
| 2,049,069 | 7/1936 | Martin | 350/98 |
| 2,114,635 | 4/1938 | Marshall | 350/98 |
| 2,215,829 | 9/1940 | Evans | 350/98 |

*Primary Examiner*—John K. Corbin
*Assistant Examiner*—B. W. delos Reyes
*Attorney, Agent, or Firm*—Hopgood, Calimafde, Kalil, Blaustein & Lieberman

[57] ABSTRACT

A hand-held color signal includes a curved reflector and first and second members of different colors. A hand-controlled control member causes a selected one of the colored members to be positioned for reflection by the reflector, thereby providing a signal of the color of the reflected member.

10 Claims, 6 Drawing Figures

MULTI-COLOR HAND SIGNAL

The present invention relates generally to signals, and more specifically to a hand-held colored signal.

The use of colors to provide instructions or guidance is widespread. Perhaps the most common use of colors for this purpose is found in the traffic light in which a green light instructs automobile and pedestrian traffic to move until the traffic light changes to red.

There are, however, numerous other applications in which color may be used to guide and control the movement of vehicles and individuals. These include the use of a signal by a crossing guard at a school crossing; a policeman at a traffic intersection; a vehicular traffic controller at a construction site, marina, or parking lot; and an attendant or guide at a stadium or arena in which the movement of individuals is controlled.

In these applications, the individual controlling the movement of vehicular or pedestrian traffic usually employs hand signals to give directions to the vehicles or individuals whose movement is being controlled. On occasions, to increase visibility, a traffic controller may wear white gloves or use a brightly colored paddle or flag. The instruction as to whether to stop or go is based on the position of the controller's hand (or paddle).

There are several drawbacks to this procedure. One is that the signal given is often not clearly visible when the driver or pedestrian in not close to the guard or controller so that by the time the driver or pedestrian is close enough to see the signal, it may be too late for him to act in accordance with that signal. A second major drawback of this procedure is that even when the hand signal can be clearly seen by the driver or pedestrian, the signal may not be clearly given or may be ambiguous as to its meaning. That is, a hand "stop" signal may be interpreted as a "go" signal, with potentially tragic results.

It is thus an object of the invention to provide a hand-operated and hand-held control signal which provides unambiguous directions that can be seen and clearly understood even when viewed at a distance.

It is a further object of the invention to provide a hand signal of the type described which utilizes accepted and universally understood color signals for stop and go instructions.

It is another object of the invention to provide a hand signal of the type described which requires no power source such as batteries.

It is still another object of the invention to provide a hand signal of the type described, which is light in weight so that it may be used without tiring the user, and which employs few moving parts to provide reliable operation over a long period of time.

The signal of the present invention includes a curved reflecting surface and elements of at least two colors, such as red and green for a traffic controller or the like. One or the other of these elements is selectively positioned by a hand-operated positioning member for reflection by the reflector, such that a clear and unambiguous signal of the color of the selected element is displayed, which can be readily seen and understood at a distance.

To the accomplishment of the above and further objects as may hereinafter appear, the present invention relates to a hand signal substantially as defined in the appended claims, and as described in detail in the following specification as considered with the accompanying drawing, in which:

Figure 1:
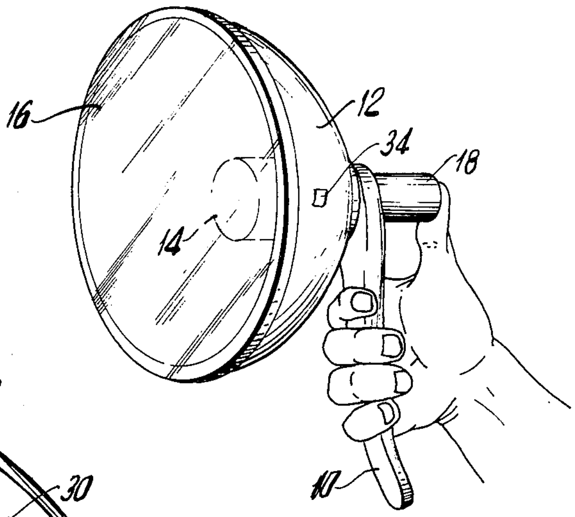
FIG. 1 is a perspective of the hand signal of the invention shown in use.

The hand signal of the present invention, as illustrated in FIG. 1, includes a handle 10, which as shown is gripped by four fingers of the user's hand, secured to a concave reflector 12, having a focus proximate the color select unit 14. The surface of the reflector 12 projects outwardly from the handle and defines a space (in the embodiment shown spherical) in which a color select unit 14 is located. Unit 14, which, as described below, includes at least two members of different colors, is secured to the housing and to the handle. The open end of the reflector may be covered with a transparent cover 16, which may conveniently be snapped onto the rim of the reflector to reduce dirt accumulation on the reflection surface.

The reflector is a concave mirror (e.g. spherical or parabolic) having a focus proximate the color select unit.

The color select unit is operated by a control member, here in the form of a push-button 18, which extends rearwardly from the reflector and handle, and as shown, is operated by the thumb of the user's hand. As will be described in greater detail below, the operation of the push-button 18 modifies the orientation of the color select unit 14 so that only one of the members of the unit 14 is proximate the focal point and is therefore reflected by reflector 12, such that a signal of the color of only that member is projected outwardly from the open end of the reflector. To this end, the positioning of the colored members is controlled by the hand operation of the control member to place only the desired colored member in position for reflection.

Figure 2:
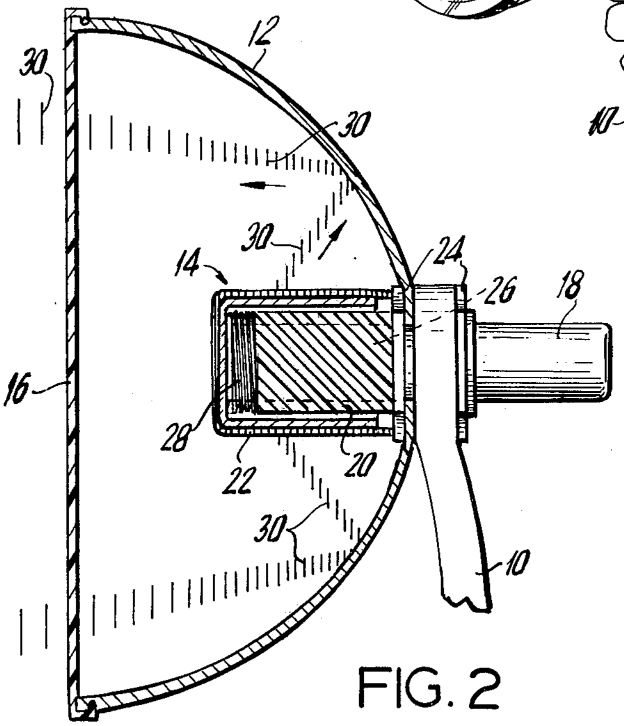
FIG. 2 is a vertical cross-section of the signal of the invention according to one embodiment thereof, shown as utilized for projecting a signal of one color.
Figure 3:
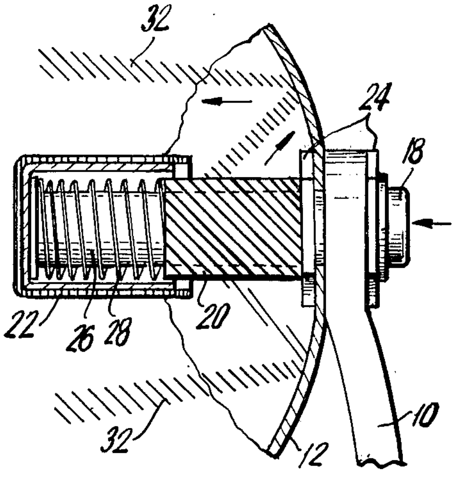
FIG. 3 is a vertical cross-section, partly broken away, of the signal of FIG. 2 as utilized for displaying a second color.

The embodiment of the invention shown in FIGS. 2 and 3, as in the other embodiments of the invention herein specifically described, is designed to selectively provide either a red or a green signal. It is to be understood that this color selection is shown only for purpose of example, and that the hand signal of the invention may be used with other colors, as well as with three or even more possible colors for selection in providing a signal.

Referring to FIGS. 2 and 3, the color select unit 14 as therein shown includes a cylinder or tube 20, here shown as green in color, and a cup-shaped member 22, here shown as red in color. Tube 20 may, as herein shown, be secured to the base of a reflector 12 and to the upper end of handle 10 by means of nuts or rivets 24. The control member 18 is in the form of a plunger 26 which has a free end extending rearwardly from the handle and reflector for thumb operation. The plunger 26 also extends through the interior of green tube 20, and has a spring 28 disposed about its inner end. One end of spring 28 is attached to or abuts the inner surface of the red cup-shaped member 22 so that button pressure expands the spring.

To display a red signal, the colored members 20 and 22 are in the positions shown in FIG. 2 in which both members are located at or near the focal point of the reflector 12, but, as shown, the green cylinder 20 is nested within and covered by the outer red member 22 with spring 28 being relatively unstressed therebetween. In this arrangement, as indicated by the rays 30 shaded for red in FIG. 2, only the red cup-shaped member is reflected by the reflector, such that a red signal, which can be clearly seen at a distance, is provided.

To display a green signal, the user presses the plunger 28 inwardly to urge the plunger against the red member 22, thereby to, as shown in FIG. 3, move the red member to the left, as viewed in the figures and away from the focal point of the reflector. In this position of the colored members, only the green tube 20, which remains at the reflector's focal point, is reflected by the reflector as shown by the rays 32 shaded for green in FIG. 3.

Upon release of pressure on the plunger 28, the pressure of spring 28 causes the displaced red member to be returned to the position shown in FIG. 2 in which it shields or covers the green tube 20, so that a red signal will again be displayed (fail safe). If desired, a transparent window 34 (FIG. 1) may be provided in the reflector to permit the user to view which of the colored members is located at the reflector focal point, that is, which color signal is being displayed.

Figure 4:
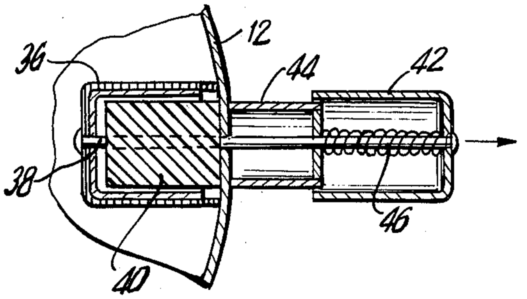
FIG. 4 is a partial cross-section of the color select mechanism of a signal according to a second embodiment of the invention shown in position for displaying a first color.
Figure 5:
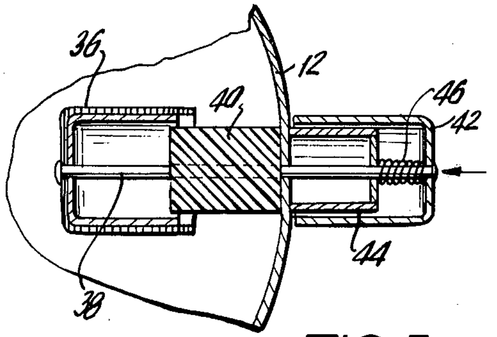
FIG. 5 is a cross-section of the color select mechanism of FIG. 4 shown in a position for displaying a second color.

The embodiment of the invention shown in FIGS. 4 and 5 is similar to the previously described embodiment in that it operates by selectively moving an overlying movable member of one color away from the reflector focal point at which time the other fixed colored member is exposed proximate the focal point and thus reflected. In this embodiment, the cup-like red movable member 36 is secured to one end of a pin 38, which extends through the cylindrical fixed green member 40. The other end of the pin 38 is secured to an activator button 42, which is axially movable in the direction of the arrows in FIGS. 4 and 5. A fixed base 44 is secured to the rear of the reflector 12 and is coaxially aligned with movable button 42 and with the fixed member 40. In this case, spring 46 is disposed around pin 38 between the outer wall of base 40 and the inner wall of button 42 and is normally extended.

As in the previous embodiment, the fixed and movable colored members are normally located at or near the focal point of the reflector, as shown in FIG. 4, with the outer member covering the inner member and being the only one of the colored members to be reflected. When it is desired to provide a signal of the color of the inner fixed member, the actuator button is pushed inward, to the left in FIG. 5, to compress the spring 46 and move member 36 away from the focal point of the mirror, and at the same time, expose the inner member 40 (as shown in FIG. 5) which is reflected by the reflector. When thumb pressure on the button 42 is released, the spring 46 urges the button and movable colored member 36 back to their respective positions, as shown in FIG. 4, whereupon a signal of the color of the outer member 36 is again displayed.

Figure 6:
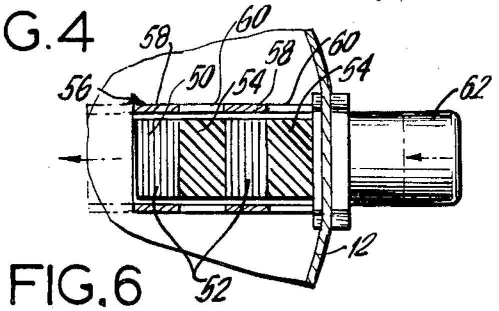
FIG. 6 is a cross-section of the color select mechanism of a signal according to a third embodiment of the invention.

FIG. 6 illustrates a further embodiment of the invention which includes a single fixed cylindrical member 50 having alternating bands 52 and 54 of different contrasting colors, e.g. red and green, which is located at or near the focal point of a parabolic mirror 12. A cylindrical shield 56 includes alternating opaque and transparent bands 58 and 60, which are of the same axial lengths as the colored bands 52 and 54 on member 50. The operation of actuating button 62 causes shield 56 to move axially to selectively expose bands of one color or member 50 while at the same time covering or blocking the bands of the other color. In this manner, the bands of only one of the colors of member 50 are reflected and displayed at any given time corresponding to the selected axial position of movable shield 56. In this arrangement, the spring may lie disposed as in either of the previous embodiments to provide a fail-safe (normally red) condition.

In the foregoing, the term "proximate" has been used when describing the relationship between the color select unit and the focal point of the concave reflector. As one skilled in the art will recognize, disposal of the color select unit at the focal point will provide parallel emanating rays in accordance with coventional theories of optics. By defocusing, a variation in beam angle suitable to the use may be afforded (as will also occur with a longer color select unit). It will also be apparent to one skilled in the art that as the color select unit becomes thicker, the concave reflector must be modified accordingly to provide the same reflection characteristics. This is most easily done empirically by variations between sperical and hyperbolic using a flexible reflector. In most cases the use will dictate the desired reflection beam or angle.

It will thus be appreciated from the foregoing descriptions of several embodiments of the invention that a hand signal is provided which provides a clear signal of a selected color which can be viewed from a distance. The display contains a few moving parts and requires no external power source. The hand signal of the invention can be readily used without difficulty by individuals having minimal skill and training. Further, the signal can be used during the night as well as during the day, so long as the oncoming vehicle or pedestrian shines a light at the signal to view the colored display provided thereby. Although the signal has been disclosed as employing a pushbutton as the control member, it will be appreciated that this may be replaced with a trigger or toggle.

It will thus be understood that although the invention has been described with respect to several embodiments, modifications may be made thereto without necessarily departing from the spirit and scope of the invention.

What is claimed is:

1. A hand-held indicator for use in selectively providing a signal of one of two preselected colors, said indicator comprising a support, concave reflector means secured to said support, first and second members of said two colors, and means operatively connected to said support and to at least one of said first and second members for selectively positioning one of said first and second members in the vicinity of the focal point of said reflector means from which the selected one of said color members is reflected by said reflector means.

2. The indicator of claim 1, in which said concave reflector means is a spherical reflector.

3. The indicator of claim 1, in which said concave reflector means is a parabolic reflector.

4. The indicator of claim 1, in which one of said first and second members overlies and covers the other of said members, said positioning means comprising means for moving said one of said members away from and thereby exposing the other of said members for reflection by said reflector.

5. The indicator of claim 4, in which said positioning means further comprises means for normally urging said first and second members to preselected related positions.

6. The indicator of claim 5, in which said support includes a handle, and said positioning means comprises operating means for operation by the hand used to hold said handle.

7. The indicator of claim 1, in which one of said colored members is fixed and the other of said colored members is movable with respect to said fixed member, said positioning means comprising means for moving said movable member from a first position in which said movable member covers said fixed member and only said movable member is reflected by said reflector means to a second position in which said fixed member is exposed and reflector by said reflector means.

8. The indicator of claim 7, in which said reflector means is a parabolic mirror, said first and second member being both located proximate the focus point of said mirror when said movable member is in said first position, only said fixed member being at substantially the focal point of said mirror when said movable member is in its said second position.

9. The indicator of claim 1, in which one of said first and second members overlies and covers the other of said members when said one of said members is to be reflected, and said positioning means comprises means for moving said one of said members away from and thereby expose the other of said members for reflection by said reflector.

10. The indicator of claim 1, in which said first and second members are coaxially arranged in alternating bands, and said positioning means comprises shield means movable between first and second axial positions, thereby to respectively expose bands of only one of said two preselected colors.

* * * * *